(12) United States Patent
Sheth Fontanetta et al.

(10) Patent No.: US 12,169,810 B2
(45) Date of Patent: Dec. 17, 2024

(54) MONITORING CONFIGURATION OF AN INVENTORY OF DEVICES USING CAPTURED IMAGES OF THE DEVICES

(71) Applicant: AT&T Intellectual Property I, L.P., Atlanta, GA (US)

(72) Inventors: Amee Sheth Fontanetta, Brick, NJ (US); Vahid Tavassoli, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 329 days.

(21) Appl. No.: 17/515,241

(22) Filed: Oct. 29, 2021

(65) Prior Publication Data

US 2023/0135898 A1    May 4, 2023

(51) Int. Cl.
*G06Q 10/087* (2023.01)
*G06T 7/00* (2017.01)

(52) U.S. Cl.
CPC ......... *G06Q 10/087* (2013.01); *G06T 7/0008* (2013.01); *G06T 2207/10016* (2013.01); *G06T 2207/30232* (2013.01)

(58) Field of Classification Search
CPC ............... G06Q 10/087; G06T 7/0008; G06T 2207/10016; G06T 2207/30232; G06V 20/52
USPC .......................................... 705/28
See application file for complete search history.

(56) References Cited

U.S. PATENT DOCUMENTS

| | | | |
|---|---|---|---|
| 11,783,573 B2* | 10/2023 | Laing | G06V 10/768 382/181 |
| 2022/0253793 A1* | 8/2022 | Hill | G06Q 10/087 |
| 2022/0351512 A1* | 11/2022 | Kassabov | G06Q 10/087 |
| 2022/0408278 A1* | 12/2022 | Whittaker | H04W 24/04 |

* cited by examiner

*Primary Examiner* — Garcia Ade

(57) ABSTRACT

The technologies described herein are generally directed to monitoring the configuration of an inventory of devices using captured images of a site. For example, a method described herein can include identifying a group of equipment installed at locations within a site. The method can further include, based on an image captured at the site by image capture equipment, detecting configuration activity at the site. Further, the method includes, based on analysis of the image, associating, by the tracking equipment, the configuration activity with equipment of the group of equipment.

20 Claims, 10 Drawing Sheets

MONITORING CONFIGURATION OF AN INVENTORY OF DEVICES USING CAPTURED IMAGES OF THE DEVICES

TECHNICAL FIELD

The subject application is related to different approaches to handling management of an inventory of devices and, for example, to providing notice that a configuration of the inventory of devices has changed.

BACKGROUND

As the number of systems and processes involved in installation and reconfiguration of network services continues to increase, management problems are becoming more likely. In some systems, an inventory system is maintained with characteristics and configurations of different installed devices. Problems can occur when changes in the configuration of devices are implemented without properly updating the inventory system.

These problems with proper updates can increase in likelihood are aggravated based on different ways that configuration can be made to devices. For example, when systems are, to change configurations, physically manipulated by technicians, the inventory system can be improperly updated, e.g., because of missing documentation or documentation mistakes made by or on behalf of the technician. When a new device is added or removed, a component of a device is added or removed, or a configuration setting is made at a terminal of a data server, and the changes made are not properly entered, the deployed inventory of devices can be rendered out of sync with the inventory system, and even more problems can occur.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
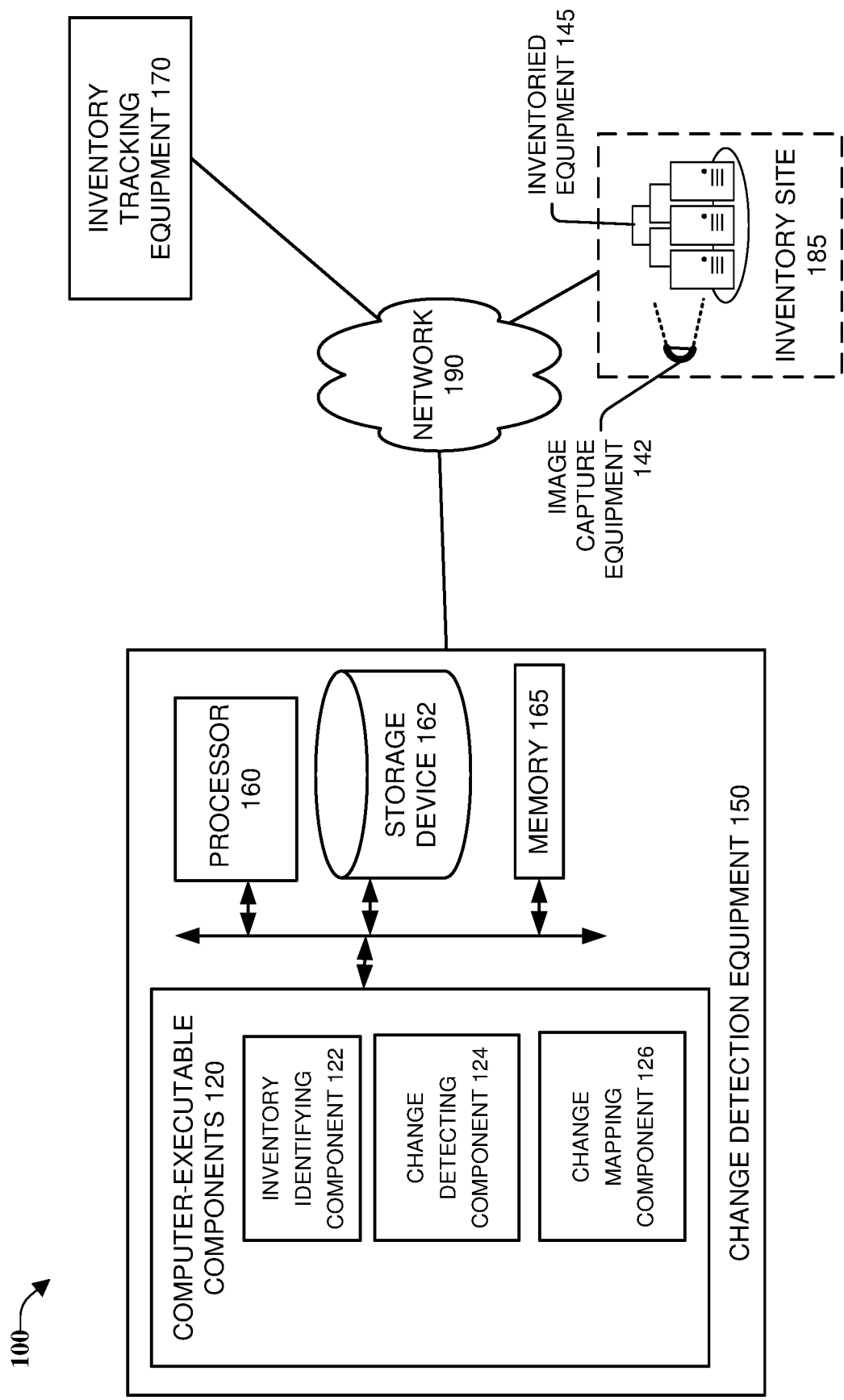
FIG. 1 is an architecture diagram of an example system that can facilitate monitoring the configuration of an inventory of devices using captured images of a site, in accordance with one or more embodiments.

Generally speaking, one or more embodiments can facilitate monitoring the configuration of an inventory of devices using captured images of a site. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., tracking complex inventories of devices), that are not abstract and cannot be performed as a set of mental acts by a human. For example, a human, or even a plurality of humans, cannot efficiently detect changes to device configurations with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate monitoring the configuration of an inventory of devices using captured images of a site. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate monitoring the configuration of an inventory of devices using captured images of a site, in accordance with one or more embodiments. For purposes of brevity, description of like elements and/or processes employed in other embodiments is omitted. It should be noted that, although many examples herein discuss user equipment with one additional network identifier (e.g., dual-provisioned user equipment), one having skill in the relevant art(s), given the description herein would appreciate that the approaches can also apply to any number of network identifiers associated with a user equipment.

As depicted, system 100 can include change detection equipment 150 communicatively coupled to inventory tracking equipment 170 and inventory site 185 via network 190. Inventory site 185 is depicted in this example including inventoried equipment 145 and image capture equipment 142. A detailed description of the components of inventory tracking equipment 170 is discussed with FIG. 2 below, and a detailed description of different aspects of inventory site 185 is discussed with FIG. 4 below.

In the non-limiting example depicted, change detection equipment 150 includes computer executable components 120, processor 160, storage device 162, and memory 165. Computer executable components 120 can include inventory identifying component 122, change detecting component 124, change mapping component 126, and other components described or suggested by different embodiments described herein, that can improve the operation of system 100.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, change detection equipment 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining inventory identifying component 122. As discussed with FIGS. 3-5 below, inventory identifying component 122 can, in accordance with one or more embodiments, identify a group of equipment installed at locations within a site. For example, in one or more embodiments, identify a group of inventoried equipment 145 installed at locations within inventory site 185.

Further, in another example, in one or more embodiments, computer executable components 120 can include instructions that, when executed by processor 160, can facilitate performance of operations defining change detecting component 124. As discussed with FIGS. 3-5 below, change detecting component 124 can, in accordance with one or more embodiments, based on an image captured at the site by image capture equipment, detect configuration activity at the site. For example, in one or more embodiments, based on an image captured at the site by image capture equipment 142, detect configuration activity for inventoried equipment 145 at inventory site 185.

In yet another example, computer executable components 120 can include instructions that, when executed by processor 160, can facilitate performance of operations defining change mapping component 126. As discussed herein, change mapping component 126 can, based on analysis of the image, associate the configuration activity with equipment of the group of equipment. For example, in one or more embodiments, based on analysis of the image, associating the configuration activity with inventoried equipment 145 of the group of equipment at inventory site 185.

Figure 2:
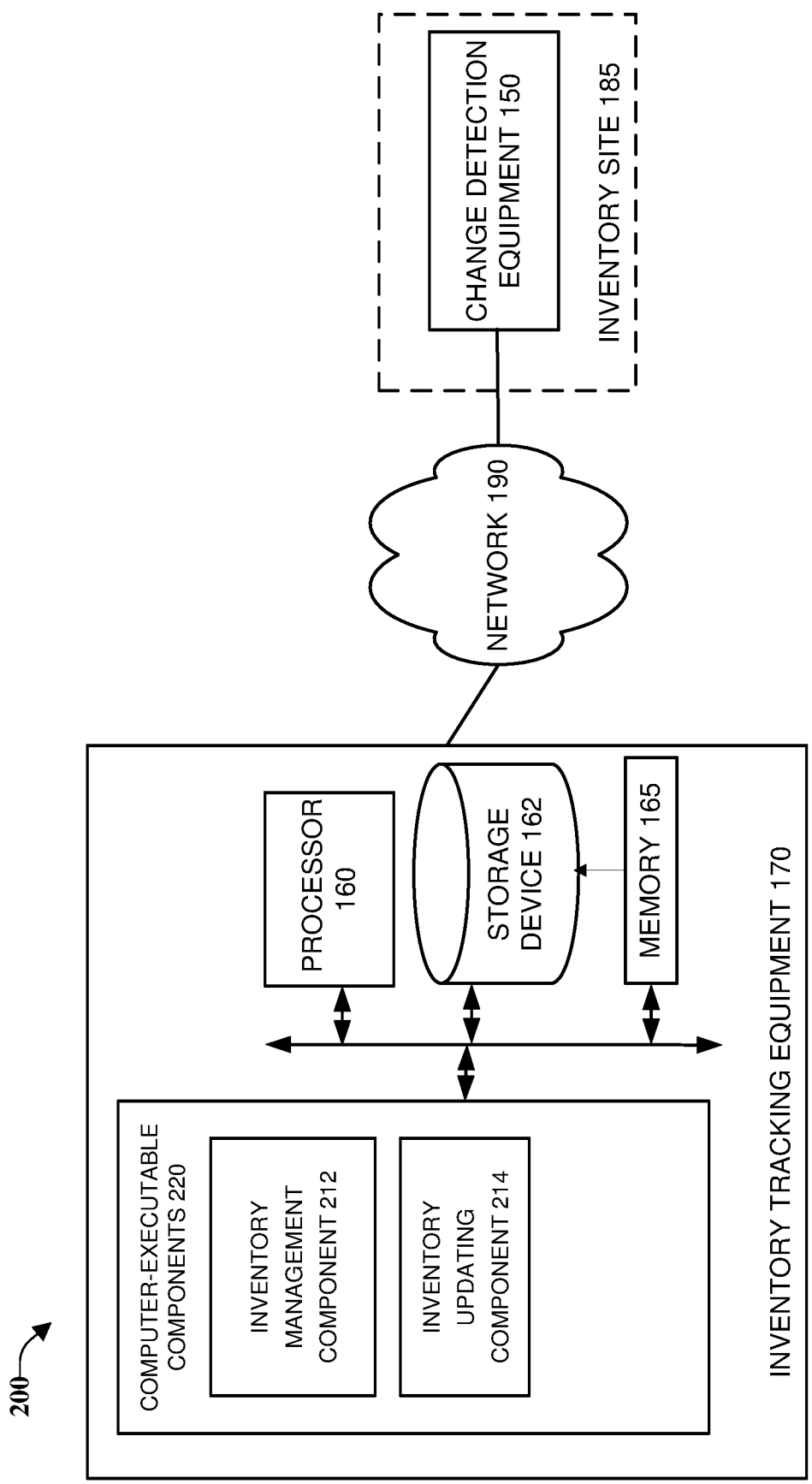
FIG. 2 is a diagram of a non-limiting example system that can facilitate monitoring the configuration of an inventory of devices using captured images of a site, in accordance with one or more embodiments.

FIG. 2 is a diagram of a non-limiting example system 200 that can facilitate monitoring the configuration of an inventory of devices using captured images of a site, in accordance with one or more embodiments. For purposes of brevity, description of like elements and/or processes employed in other embodiments is omitted.

As depicted, system 200 can include inventory tracking equipment 170 connected to change detection equipment 150 at inventory site 185 via network 190. It should be noted that, in contrast to FIG. 1, in FIG. 2, change detection equipment is depicted as operating at inventory site 185. This placement of functions is a non-limiting example of where different operations can be performed.

Change detection equipment 150 can include memory 165 that can store one or more computer and/or machine readable, writable, and/or executable components and/or instructions 220 that, when respectively executed by processor 160, can facilitate performance of operations defined by the executable component(s) and/or instruction(s).

In system 200, computer executable components 220 can include inventory management component 212, inventory updating component 214, and other components described or suggested by different embodiments described herein that can improve the operation of system 200. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, inventory tracking equipment 170 can further comprise various computer and/or computing-based elements described herein with reference to mobile handset 900 of FIG. 9 and operating environment 1000 described with FIG. 10.

In a non-limiting example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 160, can facilitate performance of operations defining inventory management component 212. As discussed further herein, in one or more embodiments, inventory management component 212 can receive equipment information corresponding to a group of equipment installed at a site, wherein the equipment information comprises information corresponding to respective locations and respective configurations of respective ones of the group of equipment. For example, one or more embodiments can receive equipment information corresponding to a group of inventoried equipment 145 installed at inventory site 185. In some implementations, the equipment information can include information corresponding to respective locations and respective configurations of respective ones of the group of equipment, e.g., with example locations and configurations discussed in more detail with FIG. 4 below.

In another example, in one or more embodiments, computer executable components 220 can include instructions that, when executed by processor 160, can facilitate performance of operations defining, inventory updating component 214. As discussed with FIGS. 4-5 below, inventory updating component 214 can receive, from configuration detection equipment, updated equipment information for identified equipment of the group of equipment, with the updated equipment information including an updated configuration applicable to the identified equipment. In one or more embodiments, the updated configuration was generated by the configuration detection equipment to update a configuration of the identified equipment based on an identified change. For example, in one or more embodiments, inventory updating component 214 can receive from change detection equipment 150, updated equipment information for identified equipment of the group of inventoried equipment 145, with the updated equipment information including an updated configuration applicable to the identified equipment. Additional details of different configurations are described with FIG. 5 below.

In one or more embodiments, the identified change was identified (e.g., by change detection component 124 of FIG. 1) based on an analysis of the activity to identify a change to the configuration of the identified equipment, resulting in the identified change. In an example, an image of activity at the site can be captured by image capture equipment, e.g., image capture equipment 142 at inventory site 185. Analysis of the activity at the site can be performed in different ways that are recognized by one having skill in the relevant art(s), given the description herein. Additionally, in examples discussed with FIG. 5 below, different artificial intelligence/machine learning (AI/ML) can be used with one or more embodiments to perform different functions, e.g., detecting the configuration activity and mapping the activity to particular inventoried equipment 145.

Figure 3:
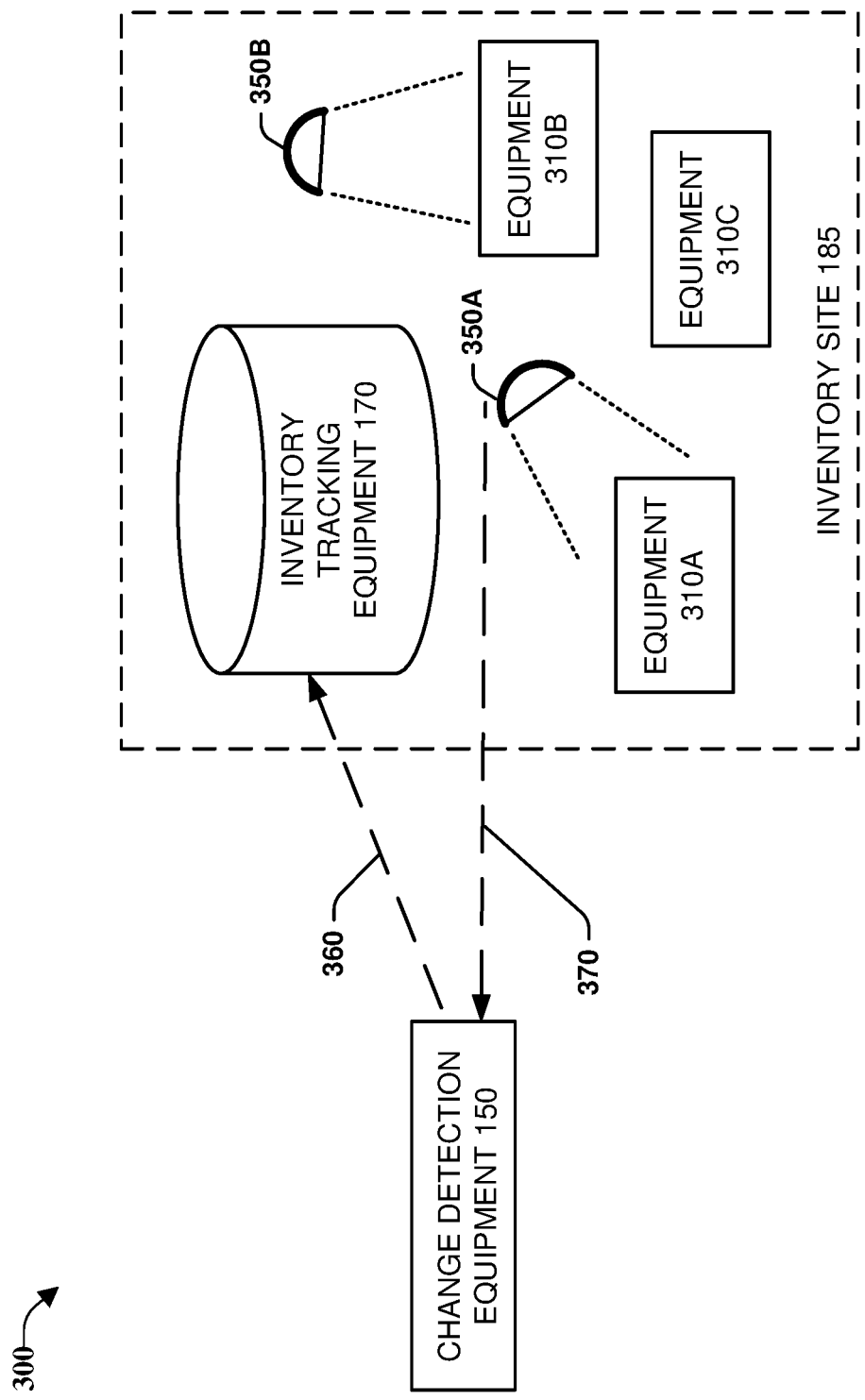
FIG. 3 is a diagram of a non-limiting example system that can facilitate monitoring the configuration of an inventory of devices using captured images of a site, in accordance with one or more embodiments.

FIG. 3 is a diagram of a non-limiting example system 300 that can facilitate monitoring the configuration of an inventory of devices using captured images of a site, in accordance with one or more embodiments. For purposes of brevity, description of like elements and/or processes employed in other embodiments is omitted.

As depicted, system 300 includes change detection equipment 150 communicatively coupled to inventory tracking equipment 170 and image capture equipment 350A-B (with only the connection to image capture equipment 350A being shown) at inventory site 185. Equipment 310A-C are depicted at inventory site 185, with image capture equipment 350A-B respectively placed to monitor equipment 310A-B. It should be noted that, in contrast to FIGS. 1 and 2, in FIG. 3 inventory tracking equipment 170 is depicted at inventory site 185.

As described above, in one or more embodiments, identified change was identified based on an analysis of the activity to identify a change to the configuration of the identified equipment. In an example, this change can be identified by change detection equipment 150 based on the equipment information stored in inventory tracking equipment 170, e.g., a data storage system that can store information corresponding to respective locations and respective configurations of respective ones of the group of equipment. For example, if a configuration change is detected by image capture equipment 350A, the location of image capture equipment 350A can be matched to the location of equipment 310A, e.g., to determine that equipment 310A is the device with the configuration being changed.

It should be noted that image capture equipment 310A-B is defined broadly herein, including but not limited to still image capturing devices and video capturing devices, e.g., a still image camera and a video camera, respectively, with video cameras being considered as capturing a sequence of images that can be used by one or more embodiments. It should further be noted that image capture equipment 310A-B can be devices deployed specifically to capture images for embodiments, or can be devices installed for other uses as well, e.g., security cameras.

In another operation that can be performed by one or more embodiments, after the change activity is detected and correlated to particular equipment, the inventory system can be updated based on the equipment and the configuration activity. Thus, for example, if an additional component is installed at a cooling station of a data center, this change could be detected by one or more embodiment, and the records describing the configuration of the cooling station stored in inventory tracking equipment 170 can be updated to reflect the change.

Figure 4:
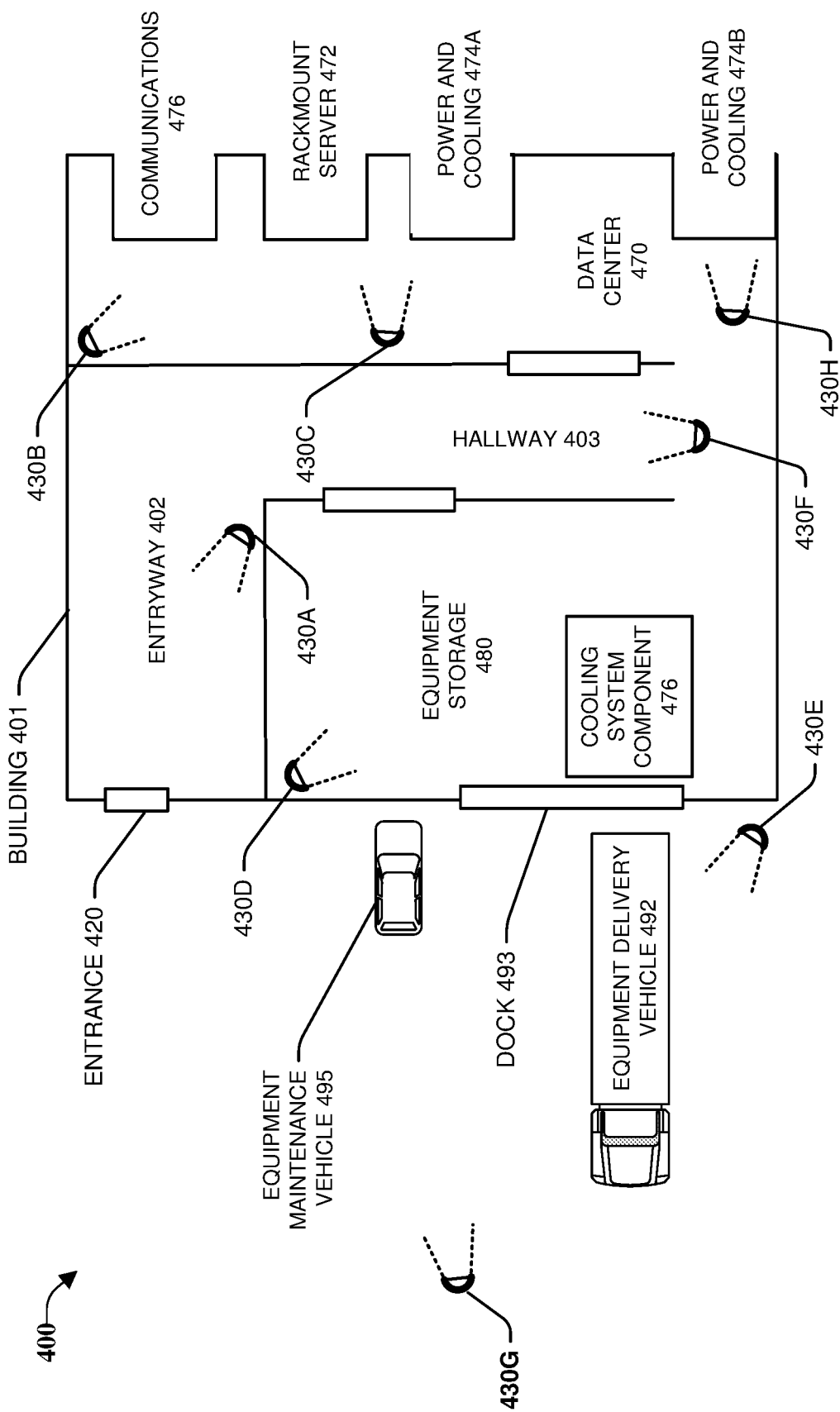
FIG. 4 depicts a flowchart of an example site plan that illustrates different embodiments of monitoring the inventory of devices with captured images of a site, in accordance with one or more embodiments.

To illustrate different types of configuration activities, different deployments of image capture equipment 350A-C, and different inventoried equipment 310A-C, FIG. 4 includes a more detailed example site plan and examples for an instance of inventory site 185.

FIG. 4 depicts an example site plan 400 that illustrates different embodiments of monitoring the inventory of devices with captured images of a site, in accordance with one or more embodiments. For purposes of brevity, description of like elements and/or processes employed in other embodiments is omitted.

As depicted, site plan 400 includes a simple diagram of building 401 at inventory site 185, in accordance with one or more embodiments. Building 401 includes indoor and outdoor features that can be relevant to one or more embodiments. Indoor features include entryway 402, hallway 403, equipment storage 480, and data center 470. Example outdoor features include entrance 420 into entryway 402, loading dock 493 into equipment storage 480, as well as equipment maintenance vehicle 495 and equipment delivery vehicle 492. Inventoried equipment installed in data center 470 includes communications equipment 476, rackmount server equipment 472, and power and cooling equipment 474A-B.

Additional relevant hardware (e.g., components that can be installed in inventoried equipment) include cooling system component 476, e.g., a component described in an example above as changing a configuration of power and cooling equipment 474A-B. Also depicted and as discussed with examples below, example image capture equipment 430A-F are placed in different positions in relation to indoor and outdoor elements of site plan 400.

Turning to the detection of configuration activity, one or more embodiments can analyze images from image capture equipment 430A-F for patterns between physical activities captured by cameras and changes to inventoried equipment at inventory site 185. For example, different configuration activities, including but not limited to addition of components, removal of components, and updates to component configurations can have different features that can be detected from captured images. For example, image capture equipment 430E can capture an image of equipment delivery vehicle 492, and image capture equipment 430D can capture an image of cooling system component 476 being delivered through dock 493. Because, in this example, equipment delivery vehicle 492 is identified by embodiments as being from a cooling system component supplier, and cooling system component 476 has identifying features of its box (e.g., distinctive pictures, bar codes, etc.), one or more embodiments can identify these as detected configuration activities associated with power and cooling equipment at inventory site 185, e.g., power and cooling equipment 474A or 474B. Other components that can be added or removed from equipment include, but are not limited to, non-volatile and volatile storage, peripheral cards with different functions, and communications interface components, e.g., port components.

Continuing this example, equipment maintenance vehicle 495 can be identified (e.g., by image capture equipment 430G) as being for a power and cooling services technician (e.g., from markings on the vehicle, license plate, etc.), a technician arrives in maintenance vehicle 495 at a particular time and is identified as a power and cooling tech. One or more embodiments can be set to capture even small details, such as tools brought into building 401, e.g., detection of particular tools for power and cooling repairs can make a planned configuration change based on power can cooling more likely.

In this example, the identified technical resource is detected coming into building 401, moving through entryway 402 to hallway 403, and moving into data center 470, e.g., by image capture equipment 430A and 430F-G. It should be noted that the image capture equipment 430A and 430D-G discussed so far are placed to detect the types of events discussed in the previous examples, e.g., placed to monitor where devices and device components are brought onsite or taken offsite, monitoring individual devices individually in areas that have large amounts of equipment, such as data center 470.

At this point in the example, one or more embodiments of change detecting component 124 can have detected the above-noted activity, and change mapping component 126 can be used to attempt to determine the inventory equipment that is implicated by the events, e.g., one or more of power and cooling equipment 474A-B. In one or more embodiments, to narrow down the potential inventory equipment implicated, image capture equipment 430C can be directed toward power and cooling equipment 474A and image capture equipment 430H can be directed toward power and cooling equipment 474B. This individual monitoring of devices or monitoring of small groups of devices can facilitate more accurate detection of configuration changes.

In one approach to improving accuracy, embodiments can assess the proximity of cooling system component 476 to either of power and cooling equipment 474B, e.g., based on a set threshold distance to reduce the likelihood of false positives. Another threshold that can be applied to improve accuracy concerns the duration of a detected activity, e.g., installing cooling system component 476 can be set by the system to be at least over a particular threshold duration, that is, if an activity is determined to have been completed too quickly, the installation of cooling system component 476 can be determined to be less likely.

It should be noted that, by using a proximity threshold, one or more embodiments can utilize periodic still images for analysis rather than a more constant video recording, e.g., after reviewing periodically captured images, whichever of power and cooling equipment 474A-B is shown as closest to cooling system component 476 can be estimated to be the implicated equipment.

In another approach to utilizing data from image capture equipment 430C and 430H (e.g., image capture equipment dedicated to monitoring specific equipment for changes), one or more embodiments can compare periodic before/after images of equipment to detect changes. For example, image capture equipment 430C also can capture images of rack mount server equipment 472, and, for some types of equipment (e.g., those, like rack mount server 472 that often have empty slots), a 'before' image of rack mount server 472 can be captured (e.g., before a new rack mount server is installed, and compared with an 'after' image of changed equipment. It should be noted that this approach can be useful in detecting the addition or removal of equipment.

In yet another approach to detecting configuration change events and determining which inventory equipment is implicated by the events, one or more embodiments can access technical information about different equipment, including, but not limited to assessing maintenance schedules (e.g., power and cooling equipment 474A may have a service call scheduled), compatibility of replacement parts (e.g., cooling system component 476 may not be compatible with power and cooling equipment 474A).

In an example of some of the capabilities of one or more embodiments, to access gathered details, change detection equipment 150 can generate queries for inventory tracking equipment 170, e.g., for a list of possible power and cooling equipment 474A-B that are deployed in data center 470. Results can include a subgroup of equipment that can be used for further analysis, e.g., analysis by change mapping component 126. One having skill in the relevant art(s), given the description herein, will appreciate that other information about equipment stored in inventory tracking equipment 170 can be retrieved by change detection equipment 150 in a similar fashion.

Figure 5:
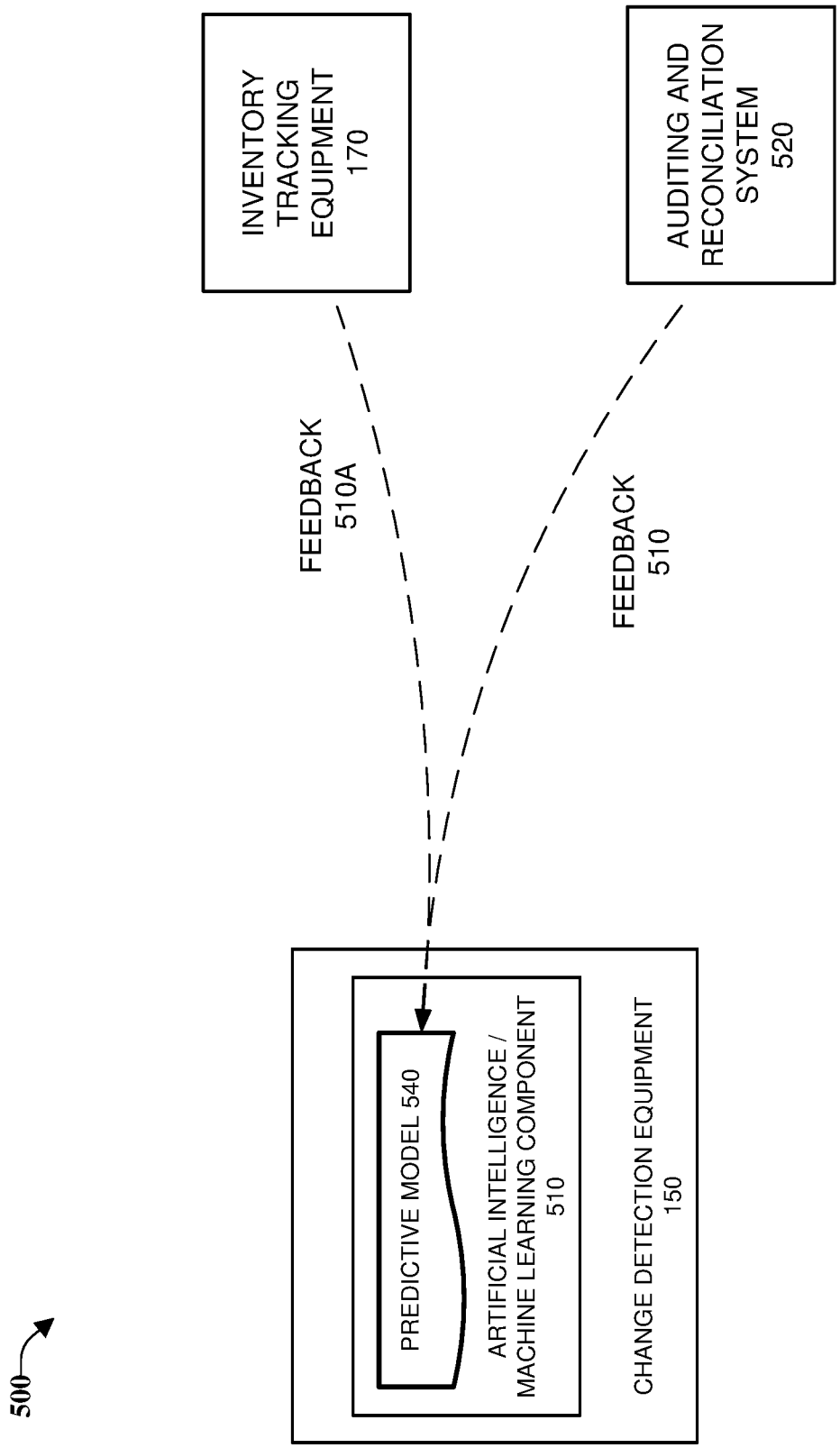
FIG. 5 is a diagram of a non-limiting example system that can facilitate utilizing AI/ML techniques to detect configuration changes and map detected changes to inventoried equipment, in accordance with one or more embodiments.

Thus, based at least on these non-limiting example approaches, data can be collected by one or more embodiments that can gather a detailed picture of potential configuration changes to different equipment at inventory site 185. In a variation of the approach to analyzing the different factors discussed above (e.g., both to detect configuration events and the mapping the detected events to equipment) one or more embodiments can utilize one or more AI/ML approaches. FIG. 5 describes sample approaches to utilizing AI/ML technologies as well as additional components that can be used.

FIG. 5 is a diagram of a non-limiting example system 500 that can facilitate utilizing AI/ML techniques to detect configuration changes and map detected changes to inventoried equipment, in accordance with one or more embodiments. For purposes of brevity, description of like elements and/or processes employed in other embodiments is omitted. As depicted, change detection equipment 150 can further comprise AI/ML components 510 to generate and maintain a predictive model 540 of configuration changes. Thus, for all of the analysis discussed and suggested above, AI/ML component 510 can be applied to increase accuracy over time.

In one or more embodiments, AI/ML components 510 can comprise an artificial neural network (ANN), e.g., initially trained and subsequently updated by image data from operation of the site. One having skill in the relevant art(s), given the description herein appreciate that different ways can be used to train ANNs and similar AI/ML components, including feeding the system images captured from operation of inventory site 185, along with reports of what configuration actions, if any, occurred along with the historical images. Similarly, the ANN can be updated by the operation of embodiments by approaches including, but not limited to, capturing and sending back records of configuration changes (e.g., feedback 510A), e.g., by correlating configuration update reports with location and timestamp data from images collected.

Alternatively, in circumstances where a second source of inventory data is used to detect errors in inventory tracking equipment 170, in addition to correcting errors in the inventory system, the errors can also be linked to training images, for updating the ANN.

In certain embodiments, different functions of AI/ML component 510 can be facilitated based on principles of AI that include, but are not limited to, classifications, correlations, inferences and/or expressions, with for example, AI/ML component 510 employing approaches that include, but are not limited to, expert systems, fuzzy logic, state vector machines (SVMs), Hidden Markov Models (HMMs), greedy search algorithms, rule-based systems, Bayesian models (e.g., Bayesian networks), non-linear training techniques, data fusion, and utility-based analytical systems. Additional implementations can include ensemble ML algorithms/methods, including deep neural networks (DNN), reinforcement learning (RL), and long short-term memory (LSTM) networks.

Figure 6:
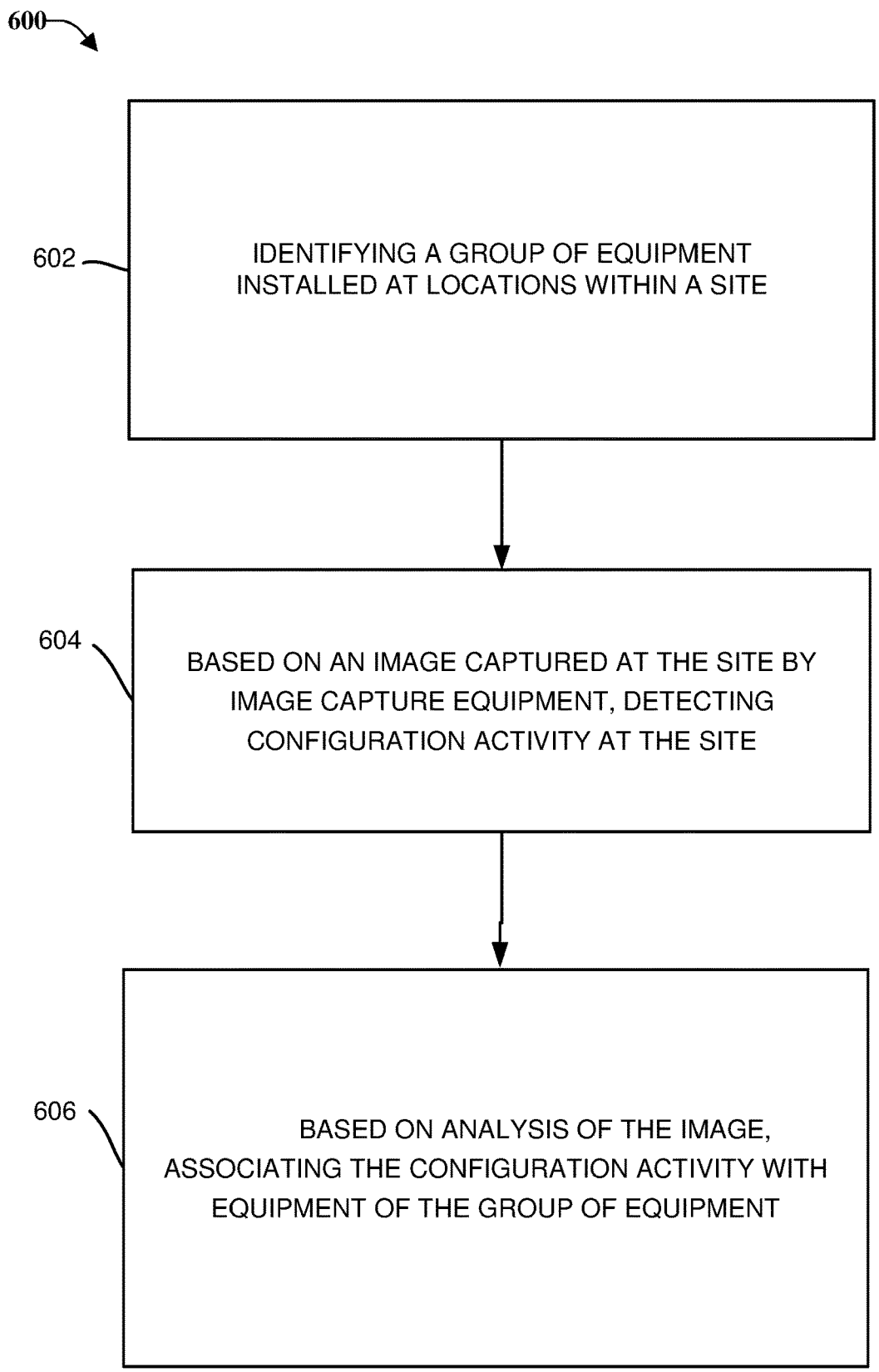
FIG. 6 illustrates an example method that can facilitate monitoring the configuration of an inventory of devices using captured images of a site, in accordance with one or more embodiments.

FIG. 6 illustrates an example method 600 that can facilitate monitoring the configuration of an inventory of devices using captured images of a site, in accordance with one or more embodiments. For purposes of brevity, description of like elements and/or processes employed in other embodiments is omitted.

At 602, method 600 can include identifying a group of equipment installed at locations within a site. For example, one or more embodiments can use a method including identifying a group of equipment installed at locations within a site. At 604, method 600 can include, based on an image captured at the site by image capture equipment, detect, by the tracking equipment, configuration activity at the site. For example, in one or more embodiments, the method can include based on an image captured at the site by image capture equipment, detecting, by the tracking equipment, configuration activity at the site.

At 606, method 600 can include based on analysis of the image, associating, by the tracking equipment, the configuration activity with equipment of the group of equipment. For example, in one or more embodiments, based on analysis of the image, associating, by the tracking equipment, the configuration activity with equipment of the group of equipment.

Figure 7:
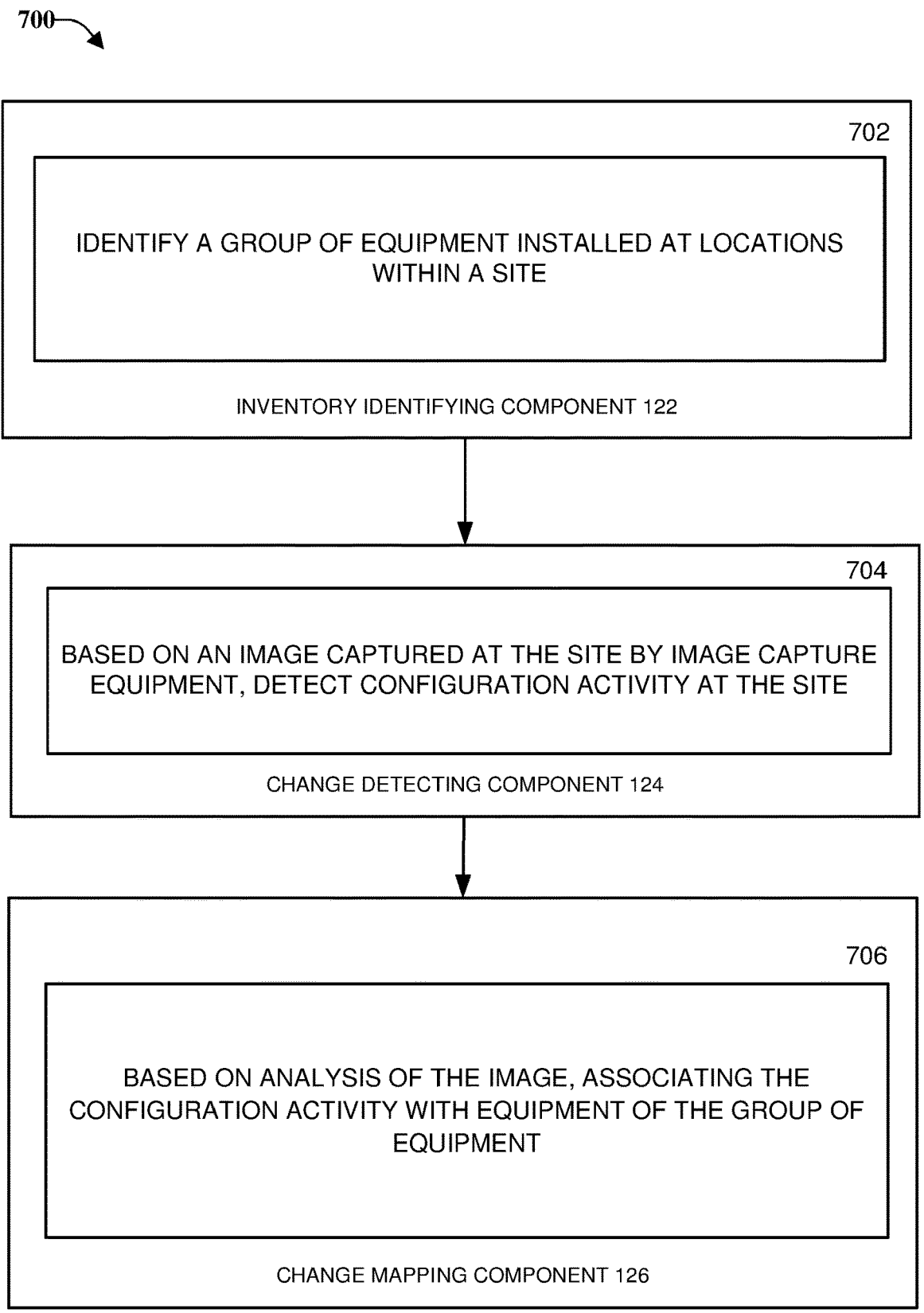
FIG. 7 depicts a system that can facilitate monitoring the configuration of an inventory of devices using captured images of a site, in accordance with one or more embodiments

FIG. 7 depicts a system 700 that can facilitate monitoring the configuration of an inventory of devices using captured images of a site, in accordance with one or more embodiments. For purposes of brevity, description of like elements and/or processes employed in other embodiments is omitted. As depicted, system 700 can include inventory identifying component 122, change detecting component 124, change mapping component 126, and other components described or suggested by different embodiments described herein, that can improve the operation of system 700.

In an example, component 702 can include the functions of inventory identifying component 122, supported by the other layers of system 700. For example, component 702 can identify a group of equipment installed at locations within a site. For example, one or more embodiments can identify a group of equipment installed at locations within a site.

In this and other examples, component 704 can include the functions of change detecting component 124, supported by the other layers of system 700. Continuing this example, in one or more embodiments, component 704 can, based on an image captured at the site by image capture equipment configuration activity at the site. For example, one or more embodiments can, based on an image captured at the site by image capture equipment, detect, by the tracking equipment, configuration activity at the site.

In an example, component 706 can include the functions of change mapping component 126, supported by the other layers of system 700. For example, component 706 can, based on analysis of the image, associate the configuration activity with equipment of the group of equipment. For example, in one or more embodiments, change mapping component 126 of change detection equipment 150 can, based on analysis of the image, associate the configuration activity with equipment of the group of equipment.

Figure 8:
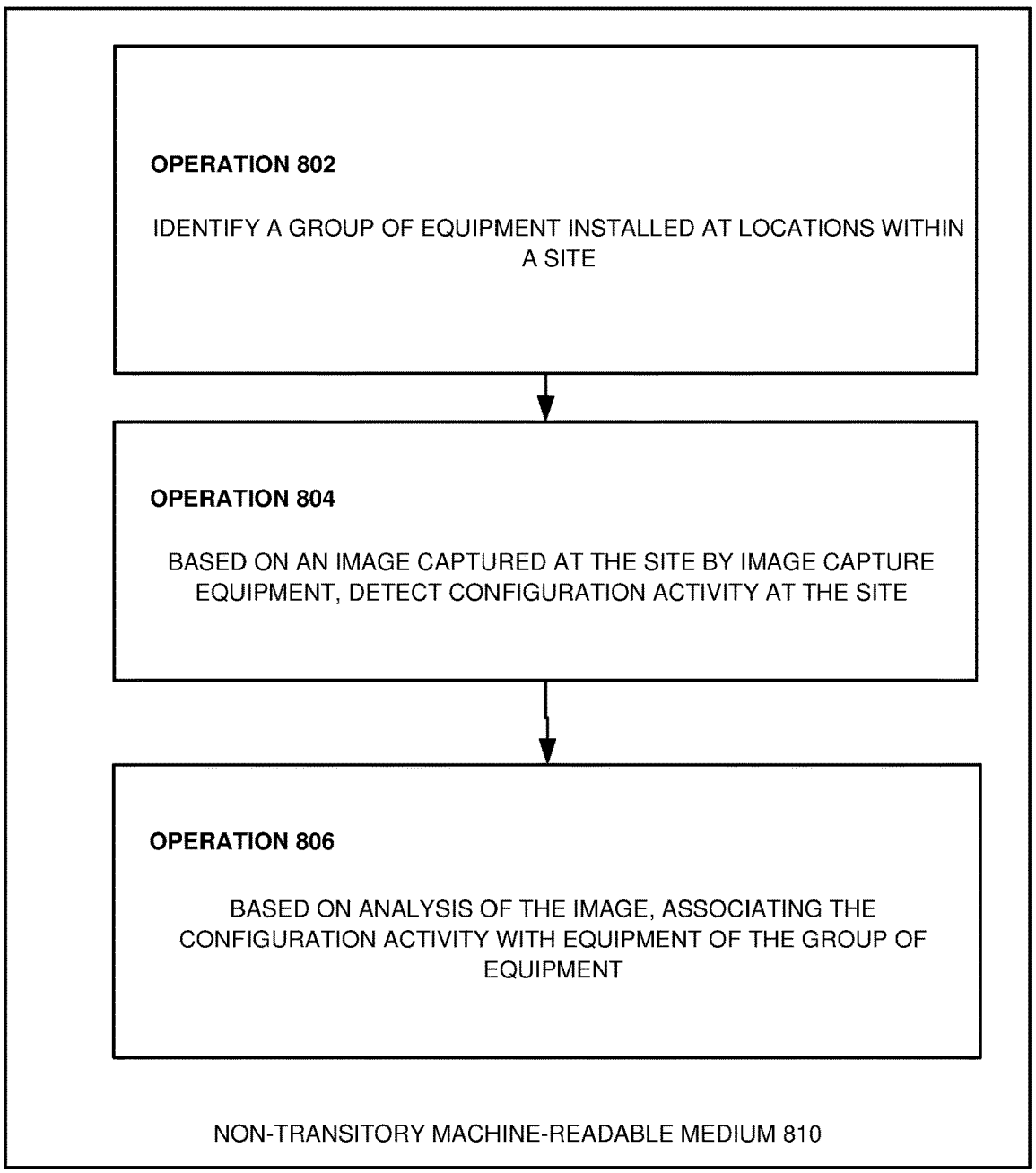
FIG. 8 depicts an example non-transitory machine-readable medium that can include executable instructions that, when executed by a processor of a system, facilitate monitoring the configuration of an inventory of devices using captured images of a site, in accordance with one or more embodiments described above.

FIG. 8 depicts an example 800 non-transitory machine-readable medium 810 that can include executable instructions that, when executed by a processor of a system, facilitate monitoring the configuration of an inventory of devices using captured images of a site, in accordance with one or more embodiments described above. For purposes of brevity, description of like elements and/or processes employed in other embodiments is omitted. As depicted, non-transitory machine-readable medium 810 includes executable instructions that can facilitate performance of operations 802-808.

In one or more embodiments, the operations can include operation 802 that can, based on an image captured at the site by image capture equipment, detect, by the tracking equipment, configuration activity at the site. For example, one or more embodiments can, based on an image captured at the site by image capture equipment, detect, by the tracking equipment, configuration activity at the site.

Operations can further include operation 804, that can, based on an image captured at the site by image capture equipment, detect, by the tracking equipment, configuration activity at the site. For example, one or more embodiments can, based on an image captured at the site by image capture equipment, detect, by the tracking equipment, configuration activity at the site.

In one or more embodiments, the operations can include operation 806 that can, based on analysis of the image, associate, by the tracking equipment, the configuration activity with equipment of the group of equipment. For example, one or more embodiments can, based on analysis of the image, associate the configuration activity with equipment of the group of equipment.

Figure 9:
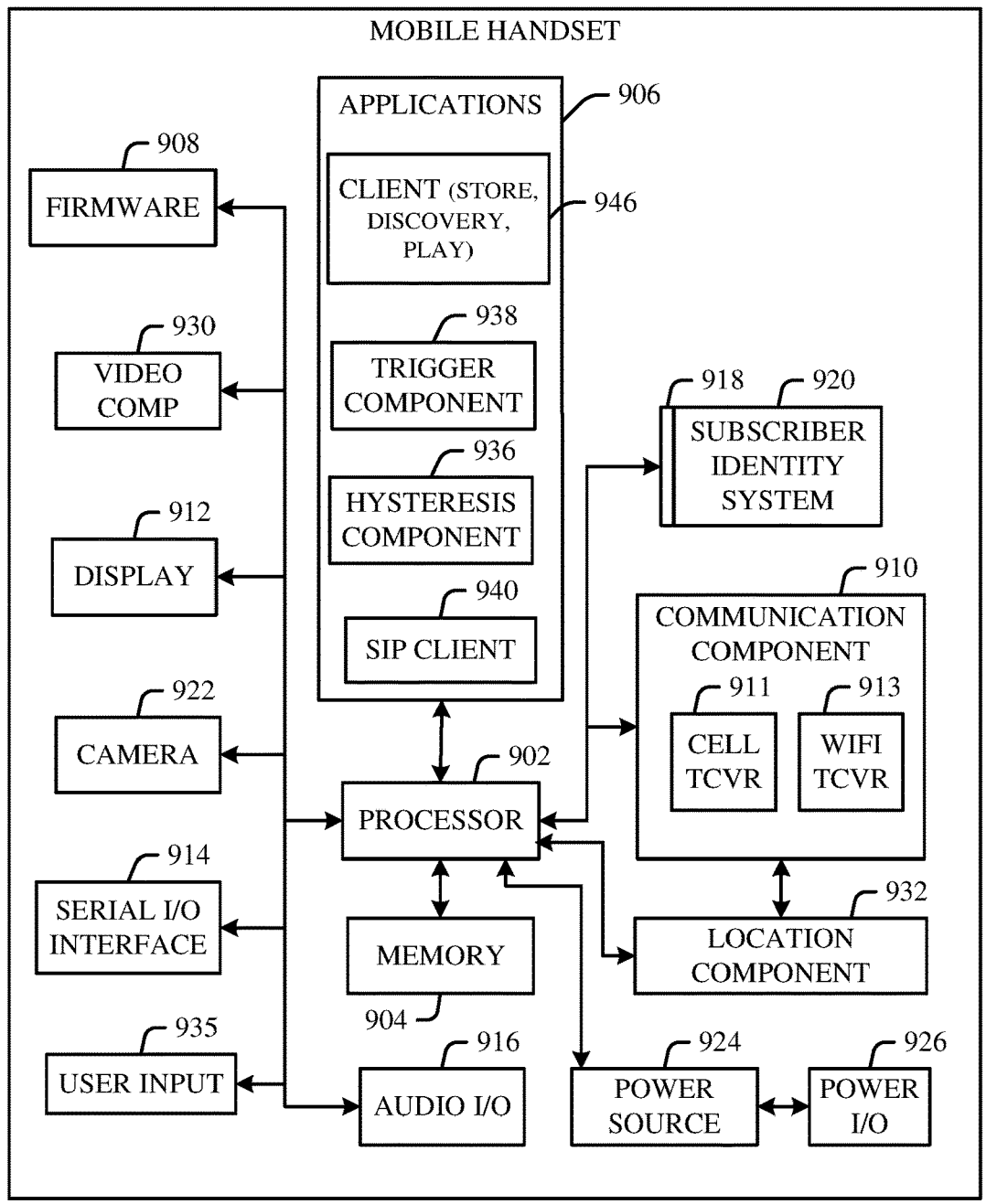
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
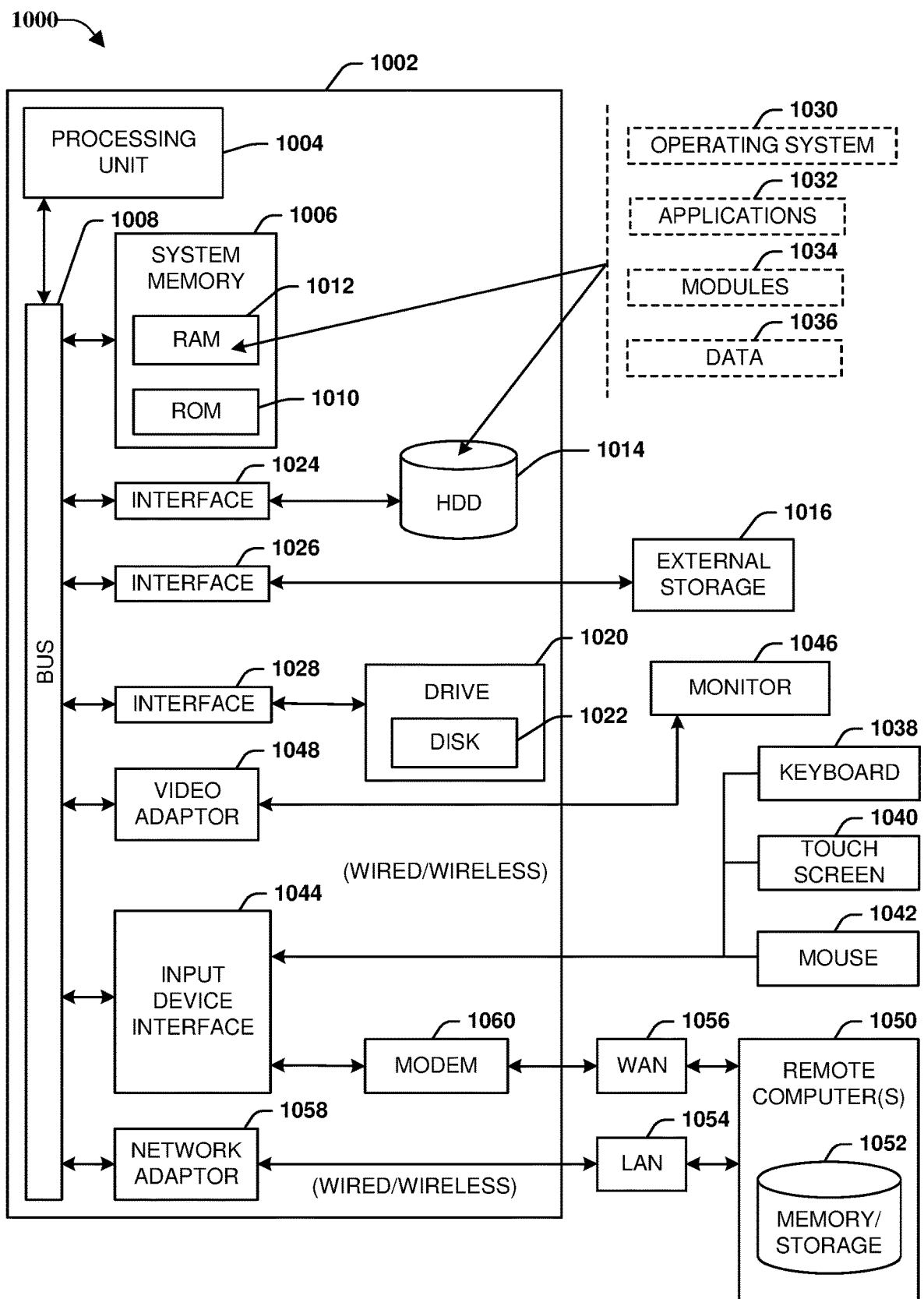
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
    identifying, by configuration equipment comprising a processor, network devices deployed at locations within a site;
    based on an image captured at the site by image capture equipment, identifying, by the configuration equipment, a configuration activity at the site associated with the network devices, wherein the configuration activity is detected via an artificial neural network implemented by the configuration equipment based upon the image as an input to the artificial neural network;
    based on an analysis of the image, associating, by the configuration equipment, the configuration activity with a network device of the network devices, wherein the associating the configuration activity with the network device comprises identifying the network device based on equipment information stored in an inventory management system accessible to the configuration equipment; and
    updating, by the configuration equipment, the inventory management system based on the configuration activity that is associated with the network device.

2. The method of claim 1, wherein the image capture equipment comprises a security camera installed at the site.

3. The method of claim 1, wherein the identifying the configuration activity comprises identifying the configuration activity within a threshold proximity to a location where the network device is installed.

4. The method of claim 3, wherein the site is a data center and the location comprises a rack of server equipment.

5. The method of claim 3, wherein the configuration activity comprises a delivery of a component, and wherein the associating the configuration activity with the network device is based on the component being determined to be compatible with the network device and the configuration activity being within the threshold proximity to the location where the network device is installed.

6. The method of claim 3, wherein the identifying the configuration activity comprises identifying a vehicle associated with changes to configuration settings of the network devices.

7. The method of claim 1, wherein the network device comprises a new network device added to the network devices, wherein the configuration activity comprises installing the new network device at an installation location at the site, and wherein the updating comprises updating the equipment information stored in the inventory management system to include the new network device and the installation location.

8. The method of claim 1, wherein the image capture equipment comprises a video camera, and wherein the image comprises a frame of a video captured by the video camera.

9. A non-transitory machine-readable medium, comprising executable instructions that, when executed by a processor of configuration equipment, facilitate performance of operations, the operations comprising:
- identifying network devices deployed at locations within a site;
- based on an image captured at the site by image capture equipment, identifying a configuration activity at the site associated with the network devices, wherein the configuration activity is detected via an artificial neural network implemented by the configuration equipment based upon the image as an input to the artificial neural network;
- based on an analysis of the image, associating the configuration activity with a network device of the network devices, wherein the associating the configuration activity with the network device comprises identifying the network device based on equipment information stored in an inventory management system accessible to the configuration equipment; and
- updating the inventory management system based on the configuration activity that is associated with the network device.

10. The non-transitory machine-readable medium of claim 9, wherein the image capture equipment comprises a video camera, and wherein the image comprises a frame of a video captured by the video camera.

11. The non-transitory machine-readable medium of claim 9, wherein the analysis of the image comprises identifying differences between the image and a previously captured image.

12. The non-transitory machine-readable medium of claim 11, wherein the site comprises a data center, and wherein the identifying the differences comprises identifying additional network devices that have been installed in a rack of network devices since the previously captured image.

13. The non-transitory machine-readable medium of claim 12, wherein the image capture equipment comprises a camera within the rack of network devices.

14. An apparatus comprising:
- a processor system of configuration equipment including at least one processor; and
- a computer-readable medium storing instructions which, when executed by the processing system, cause the processing system to perform operations, the operations comprising:
  - identifying network devices deployed at locations within a site;
  - based on an image captured at the site by image capture equipment, identifying a configuration activity at the site associated with the network devices, wherein the configuration activity is detected via an artificial neural network implemented by the configuration equipment based upon the image as an input to the artificial neural network;
  - based on an analysis of the image, associating the configuration activity with a network device of the network devices, wherein the associating the configuration activity with the network device comprises identifying the network device based on equipment information stored in an inventory management system accessible to the configuration equipment; and
  - updating the inventory management system based on the configuration activity that is associated with the network device.

15. The apparatus of claim 14, wherein the image capture equipment comprises a video camera, and wherein the image comprises a frame of a video captured by the video camera.

16. The apparatus of claim 14, wherein the analysis of the image comprises identifying differences between the image and a previously captured image.

17. The apparatus of claim 16, wherein the site comprises a data center, and wherein the identifying the differences comprises identifying additional network devices that have been installed in a rack of network devices since the previously captured image.

18. The apparatus of claim 17, wherein the image capture equipment comprises a camera within the rack of network devices.

19. The apparatus of claim 14, wherein the identifying the configuration activity comprises identifying the configuration activity within a threshold proximity to a location where the network device is installed.

20. The apparatus of claim 19, wherein the site is a data center and the location comprises a rack of server equipment.

* * * * *